(12) United States Patent
Monette et al.

(10) Patent No.: US 7,411,945 B2
(45) Date of Patent: Aug. 12, 2008

(54) ADAPTIVE ROUTER ARCHITECTURE ENABLING EFFICIENT INTERNAL COMMUNICATION

(75) Inventors: Sylvain Monette, Blainville (CA); Mathieu Giguere, Pincourt (CA); Martin Julien, Laval (CA); Benoit Tremblay, Laval (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 567 days.

(21) Appl. No.: 11/038,204

(22) Filed: Jan. 21, 2005

(65) Prior Publication Data

US 2005/0169276 A1 Aug. 4, 2005

Related U.S. Application Data

(60) Provisional application No. 60/540,351, filed on Feb. 2, 2004.

(51) Int. Cl.
*H04J 1/16* (2006.01)
*H04L 12/56* (2006.01)

(52) U.S. Cl. .................. 370/360; 370/216; 370/220

(58) Field of Classification Search ................. 370/386, 370/419, 463, 338, 337, 400, 401, 220, 230, 370/235, 389, 360, 216, 228, 237, 238; 709/220–222, 709/238–242, 251; 710/104, 105
See application file for complete search history.

(56) References Cited

U.S. PATENT DOCUMENTS 6,473,396 B1   10/2002   Kumar ...................... 370/220
7,197,565 B2 *  3/2007   Abdelaziz et al. ........... 709/226
2001/0048687 A1 * 12/2001   Coden ......................... 370/403
2003/0120822 A1 *  6/2003   Langrind et al. ............ 709/251

FOREIGN PATENT DOCUMENTS

WO   WO 02/30045   4/2002

OTHER PUBLICATIONS

PCT International Search Report of Mar. 29, 2005 from corresponding application PCT/IB2005/050387.

(Continued)

*Primary Examiner*—John Pezzlo
(74) *Attorney, Agent, or Firm*—Alex Nicolaescu; Ericsson Canada Inc.

(57) ABSTRACT

A router comprising a plurality of elements, each having an element identifier, subdivided into a plurality of groups of at least one element. Each group has a common identifier and each member within each group shares redundant capabilities. Each element is capable of communicating with another element by addressing information to the common identifier instead of the element identifier. Optionally, one element can be a member of more than one group. Another option suggests that all elements within a group share essential information associated with a service provided by the group. Another option is implemented through one element of the router identifying a primary element for a group, wherein the primary element serves requests addressed the corresponding common identifier. Yet another option suggests that one element is identified through configuration of the router as a primary element in its group to serve requests addressed to the common identifier.

6 Claims, 6 Drawing Sheets

OTHER PUBLICATIONS

Ram Gopal, Separation of Control and Forwarding Plane Inside a Network Element, High Speed Networks and Multimedia Communications 5$^{th}$ IEEE International Conference, Jul. 3-5, 2002, XP010603016.

James Aweya, On the Design of IP Routers, Part 1: Router Architectures, XP-004190486, Journal of Systems Architecture, Elsevier Science Publishers BV., Amsterdam, NL, vol. 46, No. 6, Apr. 2000.

T. Anderson, ForCES Architectural Framework and FE Functional Model, Internet Draft, Working Group ForCES, Nov. 2001, XP-002248249.

Dan Decasper et al., Router Plugins: A Software Architecture for Next-Generation Routers, XP-000924285, IEEE/ACM Transactions on Networking, IEEE Inc. New York, US, vol. 8, No. 1, Feb. 2000.

* cited by examiner

ADAPTIVE ROUTER ARCHITECTURE ENABLING EFFICIENT INTERNAL COMMUNICATION

PRIORITY STATEMENT UNDER 35 U.S.C S.119 (e) & 37 C.F.R. S.1.78

This non-provisional patent application claims priority based upon the prior U.S. provisional patent applications entitled "PG-ROUTER", application No. 60/540,351, filed Feb. 2, 2004, in the name of Sylvain Monette, Mathieu Giguère, Martin Julien and Benoit Tremblay.

BACKGROUND OF THE INVENTION

1. Field of the Invention

The invention relates to routers and, more specifically, to a new adaptive router architecture.

2. Description of the Related Art

Researchers and designers face major challenges when researching, studying, and developing new software features to extend the set of Internet Protocol (IP) services or functions that current commercial routers support beyond the usual forwarding service. This could be for experimental system, pilot network deployment or field implementation. The main problem in developing, validating and deploying new IP services stems from the lack of open and programmable routers. This could be particularly useful to experiment new IP services, for new IP service validation as well as for complete network implementation. Such an architecture, in order to be effectively used as described, should further have the following characteristics:

Scalable;
Dependable (i.e. no single point of failure); and
Predictable (e.g. in terms of performance).

However, today's commercial routers, whether they are hardware based or software based, do not have the necessary elements and interfaces that would allow new IP services and applications to run thereon. As a result, carrying out a deployment in a production network requires involvement of the router vendor to develop and implement the necessary IP services and protocols. A router vendor is not likely to invest the required resources in the development and implementation of new features, except if it sees major compensation in return for the effort. Still when router vendors can be persuaded to implement new features, the process to change their implementation is laborious and time-consuming. Likewise, network operators are unlikely to ask for new features unless they have trust in the research results or can conduct trials in their own network to validate the results.

As can be appreciated, there is currently a need for an open and programmable router architecture. The present invention provides such a solution.

SUMMARY OF THE INVENTION

A first aspect of the present invention is directed to a router comprising a plurality of elements each having an element identifier. The plurality of elements is subdivided into a plurality of groups of at least one element. Each group has a common identifier and each member within each group shares redundant capabilities. Furthermore, each of the plurality of elements is capable of communicating with at least another element of the plurality of elements by addressing information to the common identifier instead of the element identifier.

Optionally, at least one element of the plurality of elements can be a member of more than one group of the plurality of groups.

Another optional implementation suggests that all elements within a group of the plurality of groups share, amongst themselves, essential information associated with a service provided by the group.

Another optional behavior of the invention occurs when at least one element of the router identifies a primary element for at least one of the plurality of groups, wherein the primary element serves requests addressed the corresponding common identifier. In such an implementation, the at least one element could further be a member of the group in which it identifies the primary element.

Yet another optional implementation of the present invention suggests that one element, in each of the plurality of groups, is identified as a primary element in its group to serve requests addressed to the common identifier, wherein the identification is performed under conditions entered through configuration of the router.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

Figure 1:
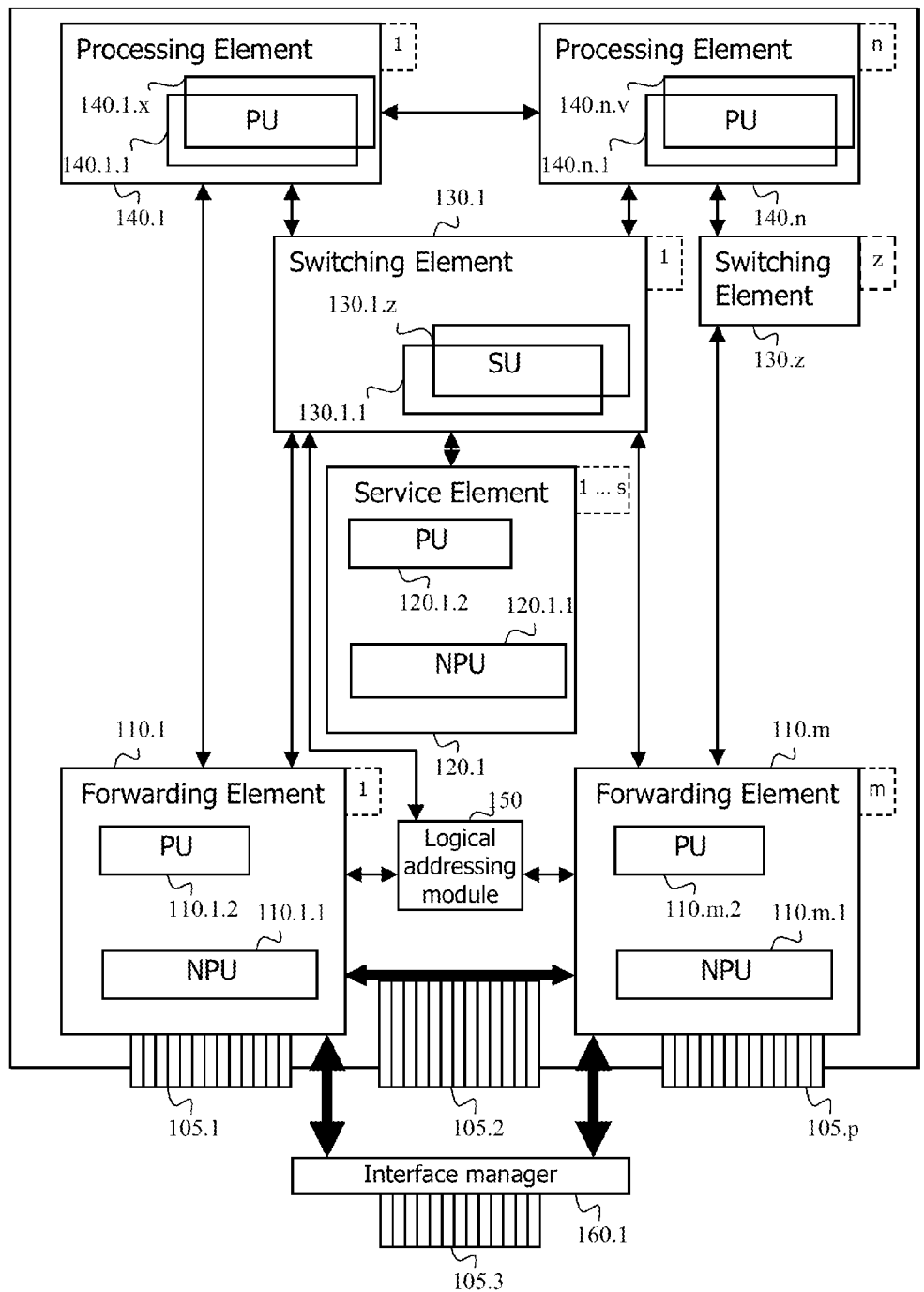
FIG. 1 is a schematic representation of an exemplary router architecture in accordance with the teachings of the present invention.

The present invention presents at least five major improvements over the prior art solutions. A first improvement comes from the internal architecture of the router. The basic principle of this improvement is to split the responsibilities usually taken care by one entity in conventional routers over multiple simple components. For instance, a router architecture based on the present invention could have forwarding elements connected to the network interfaces of the router, processing elements connected to the forwarding elements through switching elements. The forwarding elements handle the tasks at high speed (e.g. wire speed of 10 Gigabit per second) and can delegate the tasks that are non-time critical to processing elements. The invention further suggests using switching elements to handle the transfer of information between the various elements of the router (e.g. between the forwarding elements and the processing elements). This enables an abstraction of the resources in both directions. For instance, when a forwarding element has information to send to a processing element, it simply sends the information to the switching element, which acts as a proxy of the processing element. The same concept applies when any processing element needs to send information to any forwarding element.

A second improvement is implemented in the switching elements that can apply a rate limiting mechanism between the forwarding elements and the processing elements. Therefore, the forwarding elements does not have to take care of the treatment capacity of the processing elements since the switching elements will drop whatever is in excess of the processing elements treatment capacity. This assumes that the processing elements have lower data rate capabilities than the forwarding elements, which is usually the case because of the complexity of the functions implemented in the processing elements. However, if the transfer occurs between two forwarding elements having similar capabilities through a switching element, than the rate limiting mechanism is simply not applied.

A third improvement is implemented by local tables maintained by the various elements of the router, but more particularly by the forwarding elements. The local tables are used to efficiently forward the traffic between the elements of the router (no matter what elements) based on characteristics of the traffic and of the service provisioning. For instance, traffic related to maintenance of a routing protocol (or any other service) needs to be directed to a specific processing element. This association "service-element" corresponds to an entry in a local table maintained by the forwarding element connected to the network where the routing protocol is used. Upon reception of corresponding traffic, the forwarding element simply detects the type of traffic and forwards the traffic to the processing element mentioned in the table. Furthermore, if the router supports the virtual router concept, then the information necessary to provide the virtual router services (e.g. in the local tables) is distributed only on elements of the router that need to have access to such information. Thereby, when the given virtual router scales and related information becomes heavier, only the elements linked thereto are affected.

A fourth improvement is implemented by using the concept of local table differently and by adding functionalities thereto. The local table can be used to maintain information related to a group of elements associated under a common identifier instead of an identifier representing a single element. This enables hot-standby redundancy as long as the essential information associated with the service provided by the element is present in all elements of the group. The responsibility of identifying a primary element actually providing the service within a group may be devoted to the members of the group (i.e. dynamically), to a configuration or to a further element of the router, which is capable of updating the elements of the group onto which one is the current primary element. This scheme can therefore provide load balancing in implementation where the primary element is chosen dynamically. Furthermore, in such a scheme, a redundant element can be used by multiple primary elements, but not necessarily by all. For instance, each forwarding elements in a router could each have a hot-standby forwarding element while the processing elements would share a common hot-standby processing element. Thereby, the number of various elements necessary in a router to provide redundancy and load balancing is limited.

A fifth improvement suggests that multiple actions of a service applicable a given packet stream can be performed in multiple elements of the router in a chained manner. This can be compared to a finite state machine where the various states are performed on different physical or virtual pieces of hardware. However, by doing so, some information used on the first element of the chain may not be accessible to the second element or may require repetition of calculation already done in the first element. Therefore, the invention suggests using a meta-data header on each packet of the packet stream during the state transition to transfer information needed for service provisioning since the information is difficult or impossible to obtain from the next element of the chain. In addition, the meta-data header describes the next action to provide to the packet.

Reference is now made to the drawings where FIG. 1 shows an exemplary router 100 architecture in accordance with the teachings of the present invention. FIG. 1 shows the main functional components of the router 100 architecture and their relationships. These components can be linked in different topologies for flexible service and packet processing. FIG. 1 presents an example of such a topology and should be seen as such. Using the topology of FIG. 1, further exemplary implementations of the present invention will also be shown.

FIG. 1 shows the router 100 with a plurality of network interfaces 105.1-105.$p$ and four main types of functional components: a plurality of Processing Elements (PE) 140.1-140.$n$, a Switching Element (SE) 130.1, a Service Element (SrE) 120.1 and a plurality of Forwarding Elements (FE) 110.1-110.$m$. The architecture allows multiple instances of SE, PE, SrE and FE to co-exist. On FIG. 1 and in the reference signs thereof, letters are used to represent the fact that a large number of components of each type could be present in the router 100. Moreover, only one instance of some components, such as the SrE 120.1, is represented on FIG. 1. It should be readily understood that this was done for clarity purposes and does not limit the number of components of any type to the number presented on FIG. 1. The PEs 140.1-140.$n$ are responsible for operations such as signalling, control and routing protocols, and the implementation of management protocols. FEs 110.1-110.$m$ use the underlying hardware to provide per-packet processing and handling as directed, for instance, by the PEs 140.1-140.$m$. The SE 130.1 enables the PEs 140.1-140.$n$ and FEs 110.1-110.$m$ to communicate between themselves and with each other. A first SE (e.g. 130.2, not shown) could be used for communication between the PEs 140.1-140.$n$ while a second SE (e.g. 130.1) could be used between the FEs 110.1-110.$m$. The SrE 120.1 is a particular type of the FEs 110.1-110.$m$ that does not have direct access to one of the network interfaces 105.1-105.$p$, but share, otherwise, substantially the same hardware architecture and raw capabilities (e.g. processing capability rather than specific service provisioning). It should also be further noted that a single network interface 105.2 could be connected to multiple FEs 110.1-110.$m$. A further network interface 105.3 is also shown connected to the FEs 110.1-110.$m$ via an Interface Manager 160.1, which can be used to manage the connection of the network interface 105.3 to at least two of the FEs 110.1-110.$m$.

The network interfaces 105.2 and 105.3 enable redundancy of the forwarding elements in various configurations. For instance, the network interface 105.2, when connected to two forwarding elements, provides a redundancy scheme wherein, for N forwarding elements, 2N cards are necessary. The two forwarding elements need to coordinate between themselves which one will act as the primary forwarding element while the second one is in a hot-standby mode. The network interface 105.3 can be programmed to provide an optimal redundancy scheme wherein, for N forwarding elements, N+1 cards are necessary. In such a scheme, the "+1" forwarding element is configured as the standby card for all the forwarding element and the Interface Manager 160.1 coordinates traffic sent to the hot-standby card. Likewise, a redundancy scheme wherein, for N forwarding elements, N+M cards can also be used. This enables some cards to have a hot-standby element while some others could rely on a common hot-standby element. Furthermore, using the same architecture, load balancing can be provided if the selection of a primary element is performed dynamically. For instance, based on the load of the network interface 105.3, the Interface Manager 160.1 can switch packets between more than one of the forwarding elements connected thereto.

In order to support any of the redundancy schemes seamlessly for all applications (local and remote), the cards of the router 100 can be grouped under a common identifier and addressed therewith. For instance, the two forwarding elements connected to the network interface 105.2 can be grouped under a common channel identifier while they each have a specific element identifier. Therefore, when a further card of the router 100 needs to send information on the network interface 105.2, it addresses it to the channel identifier and it is served by one member of the group. Coordination needs to be done between all elements grouped under the channel identifier to know which one will serve the requests. This coordination can be done internally (e.g. under conditions), through an external intelligent element (e.g. the Interface manager 160.1) or a setting entered upon configuration of the router 100. This approach also enables all types of element of the router to have a redundant element (and not only the forwarding elements). For instance, a switching element having a second standby element could provide proxy functionality under a common channel identifier (even though they have distinct element identifiers). The router 100 could then, be arranged so that only the common identifier is thereafter used to access the proxy functionality. The proxy functionality, through the channel identifier, could then be linked to two processing elements (or two groups of processing elements) using solely the channel identifier. Therefore, a forwarding element that needs to reach a processing element will use the channel identifier of the proxy instead of one of the element identifier.

The Interface Manager 160.1 is shown on FIG. 1 as an external component to the router 100, but could also be integrated into the router 100 without affecting the teachings of the invention.

The logical interactions between these different functional elements are identified by arrows on FIG. 1. The separation of the FEs 110.1-110.*m* from the PEs 140.1-140.*n* adds several benefits to the router 100 architecture. It allows PEs 140.1-140.*n* and different types of FEs 110.1-110.*m* to interoperate with each other, and thus it becomes possible, for instance, to integrate PEs 140.1-140.*n* and FEs 110.1-110.*m* from different vendors in the router 100. This turns into a lot more design choices and flexibility when it comes to network service provisioning. Scalability is also easily provided by this architecture since additional forwarding or processing elements can be added without the need for major system upgrades.

The router 100 may further support the virtual router concept, which enables subdivision and virtualization of the router 100's resources into a plurality of virtual routers, each providing services independently. Each virtual router may involve many elements and many different types of elements. For instance, a switching element could be linked to two different virtual routers together with a dedicated forwarding element and a processing element shared among three virtual routers. Nevertheless, a virtual router is linked to a limited number of elements and network interfaces. Thus, instead of distributing the information needed for the proper functioning of the virtual router on all elements, the present invention distributes it only to the relevant elements, thereby optimizing the resource consumption of the router 100. As a direct consequence, scalability of the router 100 is improved.

Processing Element

Figure 2:
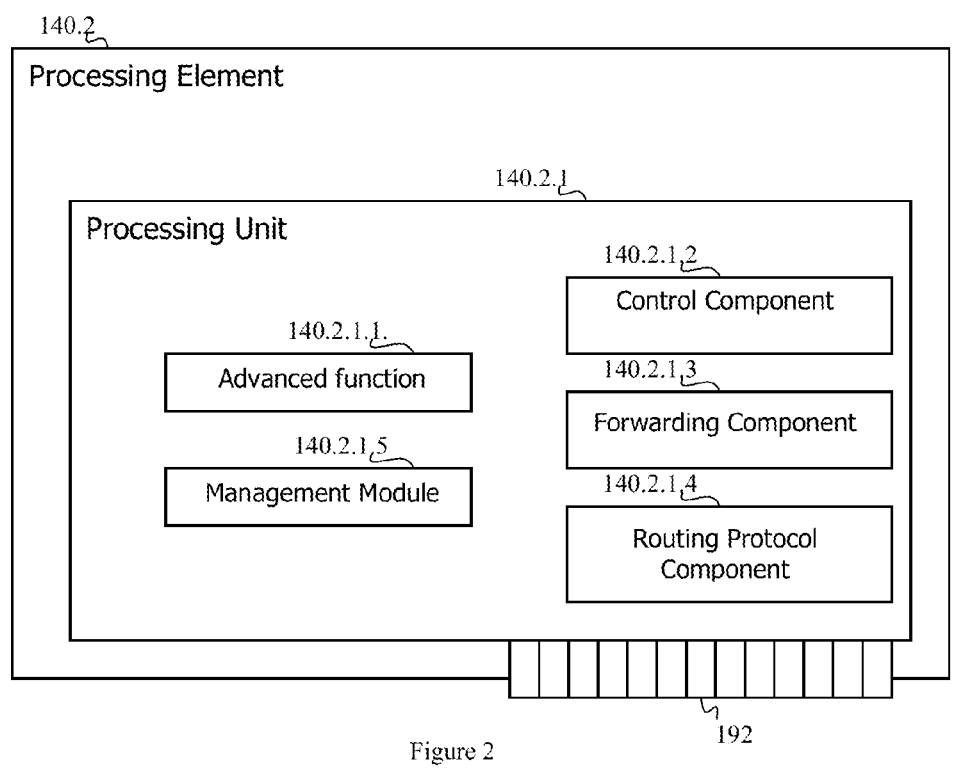
FIG. 2 is an exemplary modular representation of a processing element in accordance with the teachings of the present invention.

Reference is now made concurrently to FIG. 1 and FIG. 2, which shows an exemplary modular view of a PE (e.g. 140.2) in accordance with the teachings of the present invention. The PEs 140.1-140.*n* are mainly responsible for operations such as routing protocols like Routing Interchange Protocol (RIP), Open Shortest Path First (OSPF) and Border Gateway Protocol (BGP), and control and signalling protocols such as Label Distribution Protocol (LDP) for Multiple Protocol Label Switching (MPLS). Based on the information obtain through the control processing; the PEs 140.1-140.*n* dictate the packet forwarding behaviour of the FEs 110.1-110.*m* (e.g. addition of new routes). The exchange of control information is performed directly between the FEs 110.1-110.*m* and PEs 140.1-140.*n* based on, for instance, the Forwarding and Control Element Separation (ForCES) protocol.

The architecture supports multiple PEs 140.1-140.*n*, which may be used for redundancy, load sharing, distributed control, or any other purposes. PEs 140.1-140.*n* are wholly responsible for coordinating amongst them thereby providing consistency and synchronization.

The PE 140.2 of FIG. 2 shows, as an example, an Advanced Function 140.2.1.1, a Control Component 140.2.1.2, a Forwarding Component 140.2.1.3, a Routing Protocol Component 140.2.1.4 and a Management Module 140.1.1.5. All these components are shown, as an exemplary implementation, in the processing unit 140.2.1 of the PE 140.2. The Advanced Function 140.2.1.1 implements the functions of the router 100 delegated to the PE 140.2 that do not have specific links to usual services provided by prior art routers (e.g. linked to new service deployment). The Control Component 140.2.1.2 is able to control the behaviour of the PE 140.2 as well as other elements of the router 100. The Forwarding Component 140.2.1.3 treats traffic received from a Forwarding Element (possibly through a switching element). The Forwarding Component 140.2.1.3 of the PE 140.2 is usually used for low rate traffic. The Routing Protocol Component 140.2.1.4 usually manages information related to the routing protocols supported by the router 100 (e.g. routing tables updates). The Management Module 140.2.1.5 is responsible for implementation of the network management protocols of the router 100. For instance, the Management Module 140.2.1.5 triggers and responds to alarms and other events related to network management. Similar functions are also implemented in further elements of the router 100. Usually, components sharing substantially the same purpose are named similarly, even though their capability could be of different range.

FIG. 2 further shows an internal interface 192 connected to the PE 140.2 through the processing unit 140.2.1. The internal interface 192 is used to communicate internally with the other elements of the router 100. The internal interface is also shown on other elements of the router 100 for the same purpose. Any other means of communication between the elements could be used without departing from the teachings of the present invention.

Forwarding Element/Service Element

Figure 3:
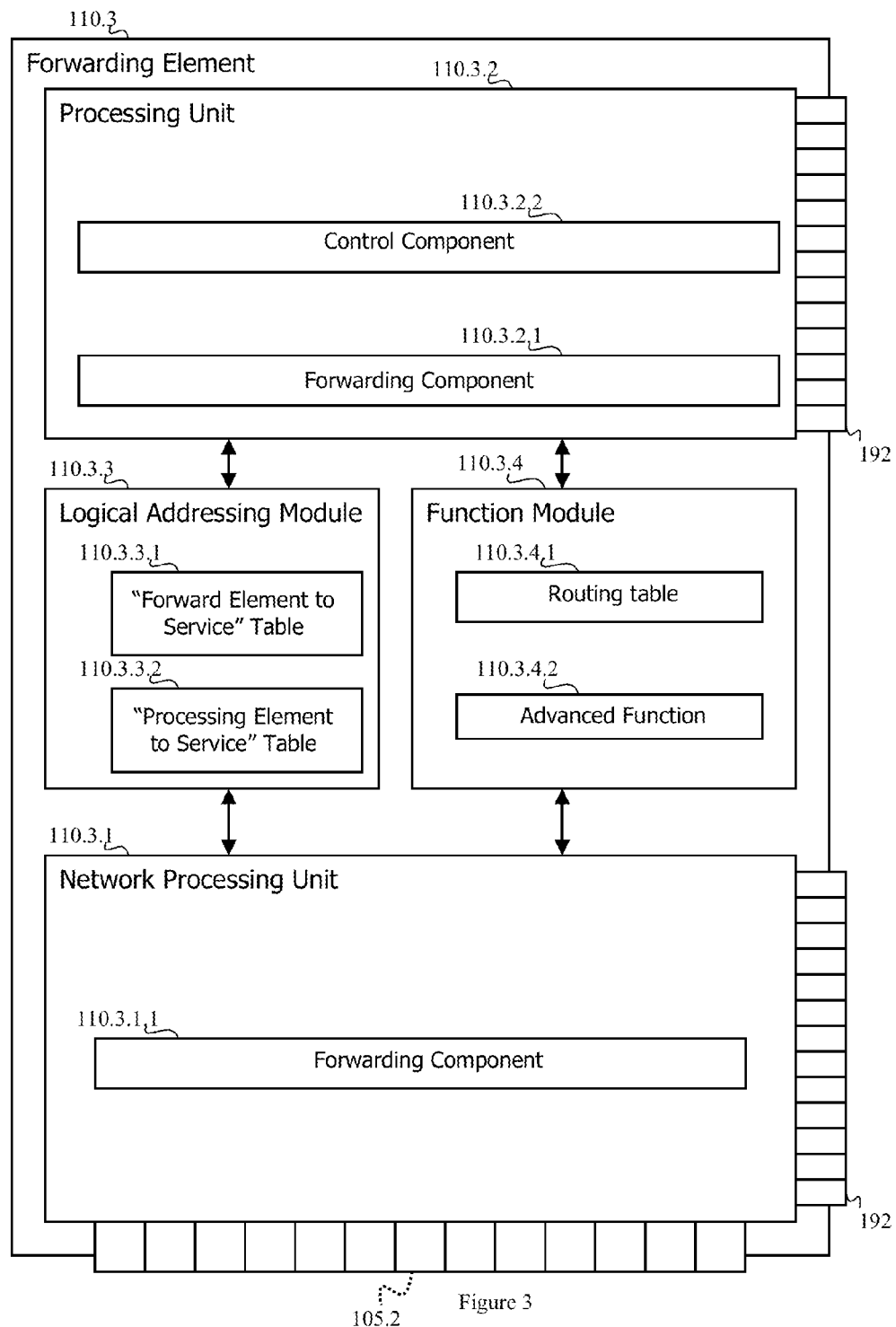
FIG. 3 is an exemplary modular representation of a forwarding element in accordance with the teachings of the present invention.

Reference is now made concurrently to FIG. 1 and FIG. 3, which shows an exemplary modular view of a FE (e.g. 110.2) in accordance with the teachings of the present invention. FEs 110.1-100.*m* perform per-packet processing and handling as directed by PEs 140.1-140.*m*. Control packets (such as RIP and OSPF messages) are redirected by the receiving FE (e.g. 110.1) to the responsible PE (e.g. 140.1) directly from the FE 110.1 to the PE 140.1. FEs 110.1-110.*m* communicate with one or more PEs 140.1-140.*n*. FEs 110.1-110.*m* have no notion of PE redundancy, load sharing, or distributed control since such functionalities are likely to be implemented in a switching element. The FEs 110.1-110.*m* are kept as simple and efficient as possible so that they focus their resources on the packet processing functions.

The architecture supports multiple FEs 110.1-110.*m*. When multiple FFs 110.1-110.*m*. are present, packets may arrive through one FE (e.g. 110.2) and leave via a different FE (e.g. 110.3). For instance, packets that enter via the FE 110.2 and leave via the FE 110.3 are transferred via a switching element through internal interfaces.

Each of these FEs 110.1-110.*m* may potentially have a different set of capabilities, with different media interfaces. FEs 110.1-110.*m* may express their capabilities to PEs 110.1-110.*n*. A packet processing operation may need multiple FE capabilities. In order to accomplish full capabilities, one FE (e.g. 110.4) may feedback to another FE (e.g. 110.5) after partial processing. FEs 110.1-110.*m* are connected in different kinds of topologies and packet processing may spread across several FEs 110.1-110.*m* in the topology.

As mentioned earlier, the SrE 120.1 of the router 100 is, in most implementation, has programmable capabilities equivalent to those of a FE without the connection to one or more network interfaces 105.1-105.*p* or without the use of such connections, even if present. On FIG. 3, this is represented by the doted line of the reference number of the network interface 105.2.

In an exemplary implementation of the present invention, the router 100 provides at least one network service using, among other elements, a forwarding element card (e.g. 110.3) connected to a network interface (e.g. 105.2). The forwarding element 110.3 comprises at least one local table 110.3.3.1-110.3.3.2 associating at least another card of the router 100 with at least a portion of the service provided by the router 100. The other card could be, for instance, a processing element card (e.g. 140.3) or a further forwarding element card (e.g. 110.4). The forwarding element card 110.3 also comprises a logical addressing module 110.3.3 capable of maintaining the local table 110.3.3.1-110.3.3.2. and a forwarding component 110.3.1.1-110.3.2.1. The forwarding component 110.3.1.1-110.3.2.1 is capable of receiving a packet stream on the at least one network interface 105.2, detecting that the packet stream requires further treatment from another card of the router 100, consulting the local table 110.3.3.1-110.3.3.2 to find an identifier to which the other card is associated based on information found in the packet stream and forwarding the packet stream toward the other card within the router 100. The forwarding component 110.3.1.1 is likely to be used for time critical applications since it is connected to the network processing unit 110.3.1 of the forwarding element card 110.3. Likewise, the forwarding component 110.3.2.1 is likely to be used for non-time critical applications since it is connected to the processing unit 110.3.2 of the forwarding element card 110.3.

A control component 110.3.2.2 may further be present in the processing unit 110.3.2. The control component is likely to be used for communication related to a function module 110.3.4 exchanged with a processing elements (e.g. 140.5). The communication can be in either direction. For instance, a communication can occur if the forwarding element needs to update a processing element in relation to signaling traffic (e.g. network management events, information related to another advanced function 110.3.4.2 of the forwarding element 110.3). A communication can also occur if the processing element card 140.5 sends an update, for instance, of a routing table 110.3.4.1 maintained in the function module 110.4 of the forwarding element card 110.3.

Switching Element

Figure 4:
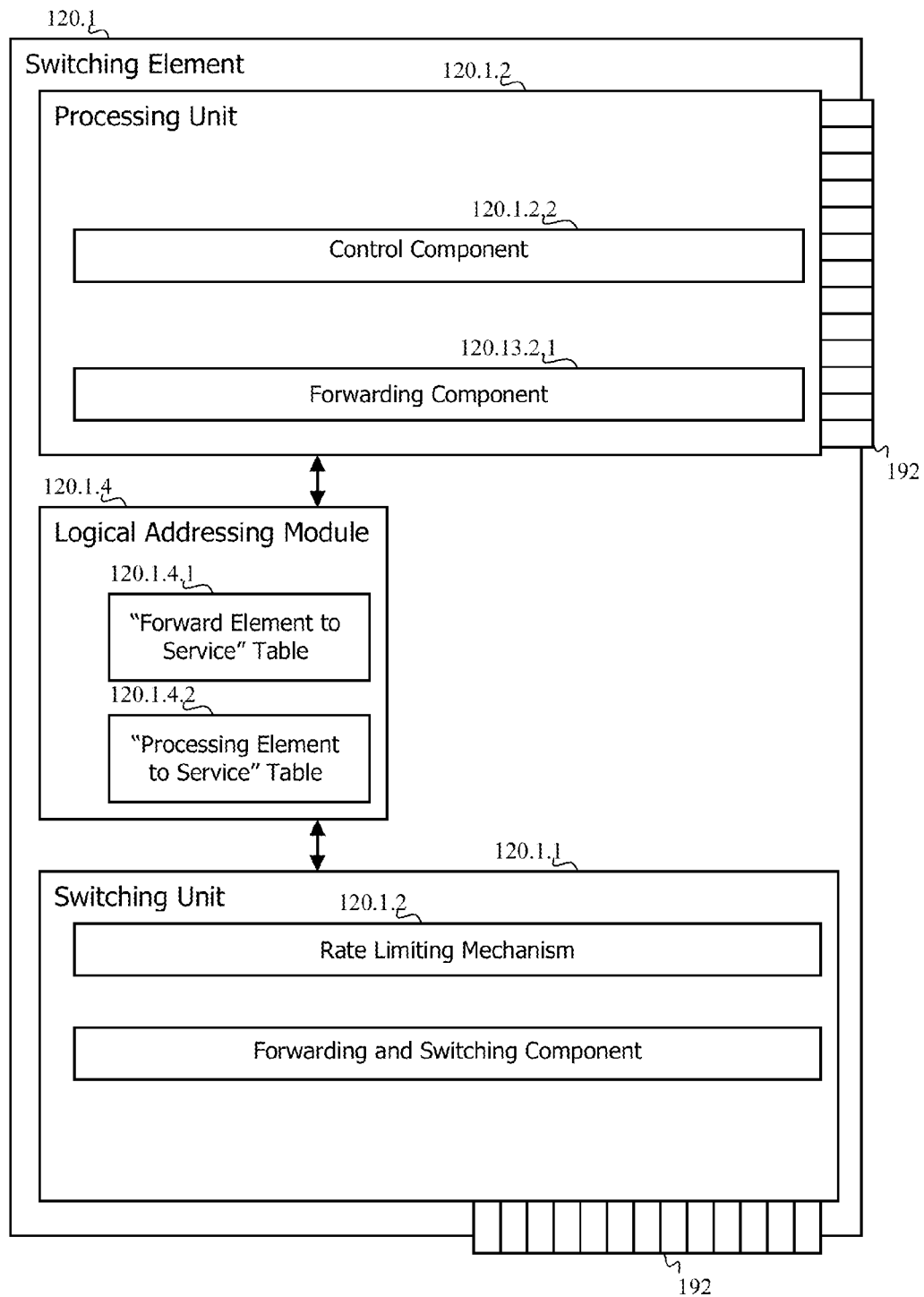
FIG. 4 is an exemplary modular representation of a switching element card in accordance with the teachings of the present invention.

Reference is now made concurrently to FIG. 1 and FIG. 4, which shows an exemplary modular representation of a switching element card 120.1 in accordance with the teachings of the present invention. Since the forwarding elements 110.1-110.*m* and processing elements 140.1-140.*n* do not have the same treatment capabilities, there could be a vulnerability of the router 100 to a denial-of-service attack targeting a processing element card (e.g. 140.6) through a forwarding element (e.g. 110.6). In order to protect the router 100 against such an attack, the switching element card 120.1 can be used to provide a rate limiting mechanism therebetween. In order to do so, the switching element card 120.1 needs to comprise a switching unit 120.1.1 capable of receiving a packet stream from the forwarding element card 110.6 of the router 100 at a first rate, determining that the packet stream is to be forwarded to a further card of the router. If the further card has a treatment rate lower than the first rate (e.g. the further card is the processing element card 140.6), passing the packet stream to a rate limiting mechanism 120.1.2 before forwarding the packet stream to the further card. Optionally, the switching unit 120.1.1 can be further capable of forwarding the packet stream to the further card without passing the packet stream to a rate limiting mechanism if the further card does not have a treatment rate lower than the first rate (e.g. the further card is another forwarding element card 140.7 or a service element card 120.2).

Physical Architecture

As an exemplary implementation, the PEs 140.1-140.*n* can be mapped to processor blades while the FEs 110.1-110.*m* can be mapped to either line cards or service blades. Processor blades use general-purpose processors whereas the line cards and service blades use network processor and general-purpose processor. The SE 120.1 can be mapped to the switch blade, which provides through a backplane the physical interconnect for all the blades in the system.

Software Components

Every packet in the router 100 belongs to a flow; every flow is part of a service. An IP service is the treatment of an IP packet within the route 100. This treatment is provided by a combination of different software components that run both on the PEs 140.1-140.*n* and the FEs 110.1-110.*m*. For instance, the time-span of a service is from the moment when the packet arrives on one of the network interfaces 105.1-105.*p* to the moment that it leaves the router 100, again, on one of the network interfaces 105.1-105.*p*.

Control components running on PEs 140.1-140.*n* define the end-to-end path control for a given service by running control/signalling protocol and management applications. These components then define the behaviour of any given FE (e.g. 110.6) for a specified packet.

The FEs 110.1-110.*m* are the first entity encountered by incoming packet streams. The FE's (e.g. 140.7) service-specific component manipulates the packet to provide it with a treatment to achieve an IP service, as defined by the control components for that IP service. Different services will utilize different components. Components may be chained across one or several FEs (e.g. 140.7, 140.8 and 140.9) to achieve a more complex service.

Distributed Finite State Machine

When a service provided by the router 100 is provided by multiple elements of the router in a chained manner, some information used on the first element of the chain may not be accessible to the second element or may require repetition of calculation already done in the first element. Therefore, the invention suggests using a meta-data header on each packet of the packet stream during the state transition to transfer information needed for service provisioning since the information is difficult or impossible to obtain from the next element of the chain. In addition, the meta-data header describes the next action to provide to the packet.

Figure 5:
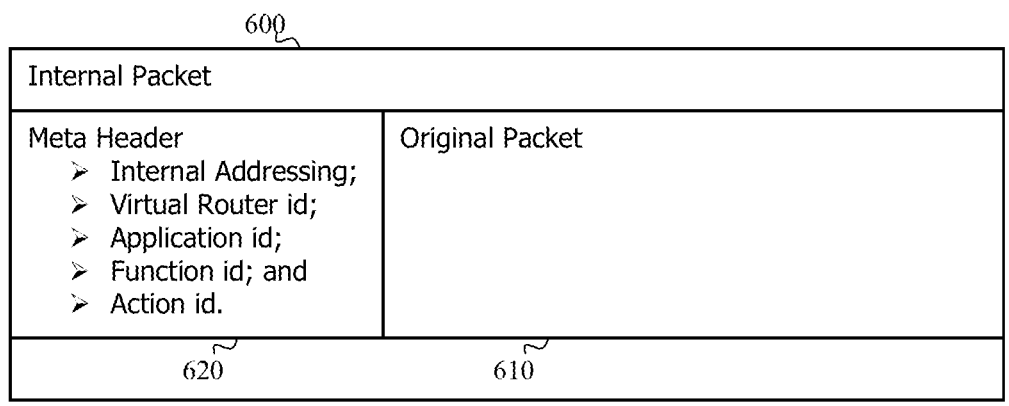
FIG. 5 is an exemplary logical representation of an internal packet in accordance with the teachings of the present invention.

FIG. 5 shows an exemplary logical representation of an internal packet 600 formed by an original packet 610 to which a metaheader 620 has been added. The metaheader 620 is typically used in the router 100 to efficiently provide information otherwise hardly obtainable from the further card and to indicate efficiently to the further card what needs to be done with the joint original packet 610. It could, for instance indicate, an internal address of the further element of the router 100, a Virtual Router id, an Application id, a Function id and/or an Action id. As an example, the Virtual Router id can be used to indicate to the further card to which particular Virtual Router the packet needs to be sent. The Application or Function ids could be used to indicate which service of the router 100 needs to be provided or updated and the Action id could indicate the next step to be applied to the original packet 610 to further provide a service of the router 100.

Figure 6:
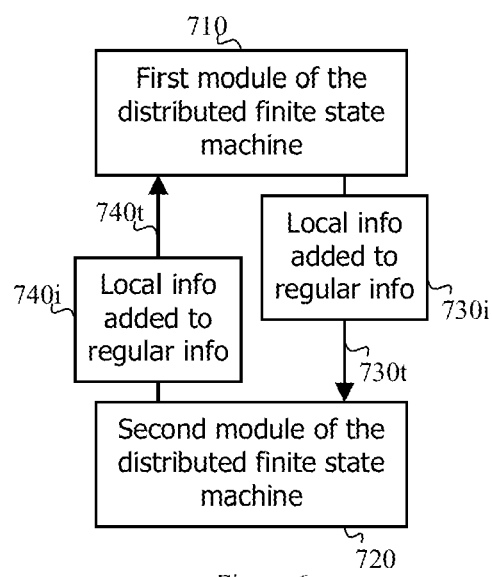
FIG. 6 is an exemplary finite state machine executed on a first and a second distinct hardware modules in accordance with the teachings of the present invention.

Reference is now made to FIG. 6, which shows an exemplary finite state machine for service provisioning. The finite state machine is executed on a first 710 and a second 720 hardware modules in accordance with the teachings of the present invention. It should be noted that the two modules 710 and 720 do not share a common memory. In such a case, a first transition 730t between a first state and a second state of the finite state machine from the first module 710 to the second module 720 is performed by sending local information 730i of the first module 710 toward the second module 720. The local information at least indicates the second state of the finite state machine. The local information 730i could further comprise results of the first state especially if the results of the first state are obtained by the first module 710 using information unavailable to the second module 720. The same concept applies for an eventual second transition 740t from the second module 720 to the first module 710 with local information 740i of the second module 720. Of course, the same concept can be generalized to any number of modules. Furthermore, in some state machines, some transitions could be performed in a classic manner if some modules share a common memory while other transitions could use the present teachings if other modules do not share a common memory.

For instance, in an exemplary implementation, the forwarding element, following reception of a packet stream, could detect that a further action is necessary to provide the service thereto. Furthermore, the forwarding element could further detect that the further action cannot be performed in the forwarding element. Thereafter, it sends the packet stream to a further element of the router by adding a meta-data header to each packet of the packet stream, wherein the meta-data header contains an identification of the further action. The meta-data header could also contain information available locally to the forwarding element that would be useful for the further card to perform the further action and that would otherwise not be available thereto. Likewise, if the forwarding element performed computation on the packet stream, it may further insert the results thereof in the meta-data header if it is useful for the further card to perform the further action.

In one exemplary implementation, the router 100 architecture comprises at least one network interface (e.g. 105.2), a plurality of processing elements (e.g. 140.1-140.n), at least one switching element (e.g. 130.1) and a plurality of forwarding elements (110.1-110.m). In this particular example, each of the plurality of processing elements 140.1-140.n comprises at least one processing unit 140.1.1 capable of processing network traffic to provide a network service. In the case of a processing element, processing network traffic comprises managing routing protocol, managing control signaling, etc. The switching element 120.1 is capable of acting as a proxy of the plurality of processing elements 140.1-140.n, forwarding elements 110.1-110.m and switching elements toward the other elements of the router 100. Furthermore, each of the plurality of forwarding elements 110.1-110.m comprises a unit (e.g. 110.1.2) capable of processing network traffic to provide a network service. In the case of a forwarding element, processing network traffic may comprise ingress treatment, Access Control List (ACL) treatment, lookup treatment, egress treatment, etc. Each of the plurality of forwarding elements 110.1-110.m is further capable of receiving network traffic on the network interface 105.2 of the router 100 and delegating processing of network traffic toward at least one of the plurality of processing elements 140.1-140.n through the switching element 120.1. Each of the forwarding elements 110.1-110.m does not need to specifically address any of the processing elements 140.1-140.n. The switching element 120.1, therefore, provides an abstraction of the resources available on the processing element-side toward the forwarding element-side. Likewise, the switching element 120.1 may also further be capable of acting as a proxy of the plurality of forwarding elements 110.1-110.m for treated network traffic received from the processing elements 140.1-140.n toward the forwarding elements 110.1-110.m, thereby providing an abstraction of the resources available on the forwarding element-side toward the processing element-side.

Each of the plurality of forwarding elements may further comprise a network processing unit 110.1.1 capable of processing network traffic. In such a case, each of the plurality of forwarding elements is further capable of using the network processing unit 110.1.1 for processing time critical network traffic and using the processing unit 110.1.2 for delegating processing of non-time critical network traffic toward at least one of the plurality of processing elements 140.1-140.n through the at least one switching element 120.1.

The processing unit 110.1.2 of each forwarding element 110.1-110.m may further be capable of communicating with at least one of the plurality of the processing elements 140.1-140.n without using the proxy capability of the switching element 120.1, but by addressing a specific one of the plurality of processing elements 140.1-140.n. An example of such a communication could relate to signaling traffic (e.g. updating routing tables, information related to a routing protocol).

In another exemplary implementation of the present invention, the router 100 comprises a network interface (e.g. 105.5, not specifically shown), a forwarding element card (e.g. 110.8, not specifically shown) connected to the network interface and a switching element card (e.g. 120.3, not specifically shown). The forwarding element card 110.8, in this particular example, has the capabilities to receive network traffic on the network interface 105.5 to detect that the network traffic requires further treatment from a further card of the router 100 and upon detection, to forward the network traffic to the switching element card 120.3 of the router 100. In such a case, the switching element card 120.3 is further capable of receiving the network traffic from the forwarding element card 110.8, apply a rate limiting mechanism on the network traffic before forwarding the network traffic to the further card. In the preceding example, the further card is assumed to have a lower treatment rate than the forwarding element card 110.8. Therefore, the rate limiting mechanism is applied based on the difference between the rate of the received network traffic and the treatment rate of the further card.

Furthermore, the switching element card 120.3 may further be capable of determining that the further card is either a further forwarding element card (e.g. 110.9, not specifically shown) or a service element card (e.g. 120.2, not specifically shown) and, thereafter, forwarding the network traffic to the card without applying the rate limiting mechanism since the further card does not have a lower treatment rate.

In a further exemplary implementation of the present invention, the router 100 comprises a network interface (e.g. 105.4, not specifically shown), a logical addressing module 150 and a forwarding element card (110.9, not specifically shown). The logical addressing module 150 is shown on FIG. 1 as an entity logically separated from the other components of the router 100. However, the logical addressing module 150 could also be co-located with the card themselves or on one card accessible from the other ones. The logical addressing module 150 is capable of maintaining at least one local table associating at least one card of the router (or a group card under a channel identifier, as discussed previously) with at least a portion of at least one service provided by the router 100. The forwarding element card 110.9, in this context, is capable of receiving a packet stream on the network interface 105.4, detecting that the packet stream requires further treatment from a further card of the router 100. The forwarding element card 110.9 does not necessarily identify specifically which of the cards of the router 100 is the further card, but rather identify that a function to be applied to the packet stream is not available locally on the forwarding element card 110.9. Upon detection that the packet stream requires further treatment, the forwarding element card 110.9 is capable of consulting the local table to find an identifier to which the further card is linked. Locating the identifier in the local table is performed based on information found in the packet stream. The forwarding element card 110.9 is then further capable of forwarding the packet stream toward the further card using the identifier. It should be noted that the packet stream is sent toward the further card rather then directly thereto. The information found in the packet stream could be located in the header of at least one packet of the packet stream. The identifier of the further card can represent either an identifier of the specific further card, but can also represent an identifier of a group of card in which the further card is a member.

Furthermore, if the router 100 supports the virtual router concept, the at least one local table could represent the information maintained in relation to a given virtual router. In such a case, the local tables would be maintained only in element cards of the router that are associated with the virtual router, thereby insuring better use of the router 100's resources.

The logical addressing module 150 may further be capable of maintaining a second local table in the further card, which table associates at least one card of the router with at least one service provided by the router 100. The local tables maintained by the logical addressing module 150 can further associate a range of network addresses with the service.

The forwarding element card 110.9 may further be capable of forwarding the packet stream toward the further card in the form of an internal packet by adding a metaheader to each original packet of the packet stream.

In the preceding example, the forwarding element card 110.9 may further be capable of forwarding the packet stream toward the further card by first sending it to a switching element card (e.g. 120.4) using the identifier from the local table. In such a context, the switching element card acts as a proxy for the further card toward the forwarding element card 110.9 and, upon reception of the packet stream from the forwarding element card 110.9, it forwards the packet stream to the further card. It may further have to act as a proxy for the forwarding element card 110.9 toward the further card if the further card needs to send traffic back to the forwarding element card 110.9.

In yet another implementation of the present invention, the router 100 can provide at least one network service. For doing so, it comprises at least one network interface (e.g. 105.5, not specifically shown), a plurality of forwarding elements (e.g. 110.5-110.7, not specifically shown) and at least one switching element (e.g. 120.7, not specifically shown). Each of the plurality of forwarding elements 110.5-110.7 is capable of receiving network traffic on the at least one network interface 105.5 of the router 100, detecting that the network traffic comprises a request for the at least one service, detecting that at least one further card of the router 100 needs to receive the network traffic in order to provide at least a portion of the at least one network service and upon detection, sending the request toward the at least one further card. In such a case, the action of sending the request toward the at least one further card is likely to encompass an intermediate action of sending the traffic to the switching element card 120.7, which is capable of acting as a proxy of the further card by receiving the request sent from a first one of the plurality of forwarding elements 110.5 toward the further card.

The switching element card 120.7 may further be capable of determining that the further card is a second one of the plurality of forwarding elements 110.6 and forwarding the network traffic thereto.

Furthermore, the router 100 may further comprise a plurality of processing elements (e.g. 140.5-140.7, not specifically shown), wherein each of the processing elements is capable of providing at least a portion of the at least one network service. In such a context, the switching element 120.7 may be further capable of determining that the further card is one of the plurality of processing elements 140.6 and forwarding the network traffic thereto.

Likewise, each of the plurality of forwarding elements 110.5-110.7 may further be capable of determining if the further card is either the forwarding elements 110.6 or the processing element 140.6. If the further is the forwarding element card 110.6, the forwarding element card 110.5 forwards the network traffic toward the further card by addressing it to the switching element 120.7. If the further card is the processing element 140.6, the forwarding element card 110.5 forwards the network traffic toward the further card by addressing it to a second switching element (e.g. 120.8, not specifically shown) capable of acting as a proxy of the further card. This second switching element 120.8 receives the request sent from the forwarding element card 110.5.

In turn, the further card may further be capable of forwarding the network traffic back to a further switching element (e.g. 120.9, not specifically shown) after treatment. The further switching element 120.9 is then further capable of forwarding the treated network traffic to a further forwarding element 110.7 of the plurality of forwarding elements 110.5-110.7, which is in turn capable of forwarding the treated network traffic on a further network interface (e.g. 105.6, not specifically shown) of the router 100.

Figure 7:
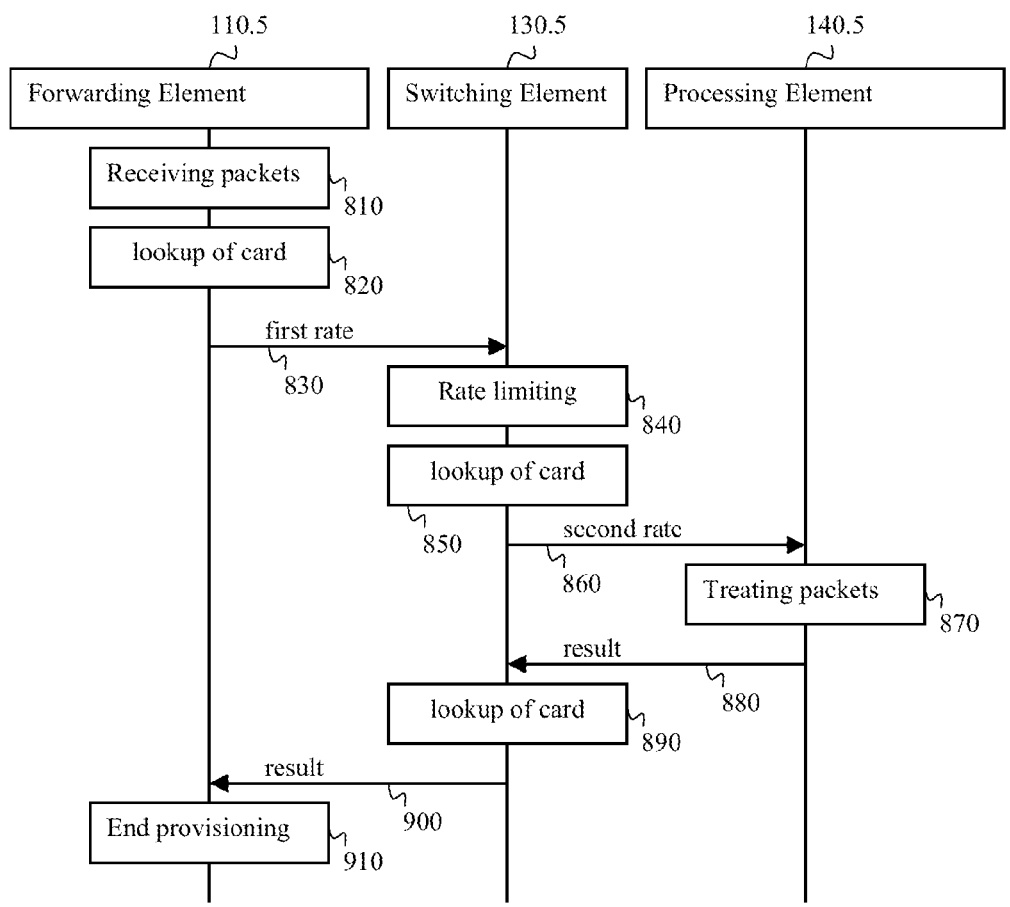
FIG. 7 is an exemplary method of service provisioning in accordance with the teachings of the present invention

Reference is now made to FIG. 7, which shows an exemplary method of service provisioning in accordance with the teachings of the present invention. The method comprises a first step of receiving a packet stream 810 on at least one network interface of the router 100 in a forwarding element card 110.5. The forwarding element card then detects that the packet stream requires further treatment from one of at least another card of the router and, upon detection, consults a local table 820 associating the at least another card of the router with at least a portion of the network service provided by the router in order to find an identifier to which the at least another card is associated based on information found in the packet stream. The forwarding element card 110.5 then forwards the packet stream toward the at feast another card within the router 830. The step 830 of forwarding is performed at the first rate and is likely to be performed toward a switching element card 130.5. The switching element card 130.5 may then apply a rate limiting mechanism 840 and may further proceed to a lookup 850 of the further card in its local tables. The packets are then further sent toward the further card (e.g. a processing element 140.5), maybe at a second rate 860 lower than the first rate if a rate limiting mechanism was applied. The method may further comprise a step of determining in the switching element card 110.5 that the further card has a treatment rate lower than the first rate prior to forwarding the packet stream from the switching element card 130.5 to the further card 140.5 at a second rate.

Although several preferred embodiments of the present invention have been illustrated in the accompanying drawings and described in the foregoing description, it will be understood that the invention is not limited to the embodiments disclosed, but is capable of numerous rearrangements, modifications and substitutions without departing from the teachings of the present invention. For example, even though the Figures present a simple router topology to facilitate understanding, this is not to be construed as a pre-requisite of the present invention. Indeed, the solution applies to routers of various kinds and is also fitted to large routers. In general, statements made in the description of the present invention do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. A router enabling efficient internal communication comprising:
    a plurality of elements each having an element identifier, the plurality of elements being subdivided into a plurality of groups of at least one element, wherein each group has a common identifier and wherein each member within each group shares redundant capabilities, wherein each of the plurality of elements:
        communicates with at least another element of the plurality of elements by addressing information to the common identifier instead of the element identifier; and
        within at least one of the plurality of groups, more than one elements being available to serve requests addressed to the corresponding common identifier;
    a first element:
        is identified as a primary element for the group; and
        serves requests addressed to the corresponding common identifier; and
    a second element:
        is subsequently identified dynamically as the primary element for the group while the first element is still available to serve requests addressed to the corresponding common identifier; and
        serves requests addressed to the corresponding common identifier.

2. The router of claim 1, wherein at least one element of the plurality of elements is a member of more than one group of the plurality of groups.

3. The router of claim 1, wherein all elements within a group of the plurality of groups share amongst themselves essential information associated with a service provided by the group.

4. The router of claim 1, wherein the first element is identified manually based on internal conditions entered through configuration of the router.

5. A method for providing load balancing between a plurality of elements of a router, wherein each of the plurality of elements has an element identifier, the method comprising the steps of:
    subdividing the plurality of elements into a plurality of groups of at least one element, each group having a common identifier, wherein a first group has a first common identifier and comprises more than one elements of the plurality of elements sharing redundant capabilities and being available to serve requests addressed to the first common identifier;
    identifying a first element as a primary element for the first group;
    serving requests addressed to the first common identifier from the first element,
    subsequently, dynamically identifying a second element of the first group as the primary element for the first group while the first element is still available to serve requests addressed to the first common identifier; and
    serving requests addressed to the first common identifier from the second element.

6. The method of claim 5, wherein the step of identifying the first element as a primary element for the first group is performed based on internal conditions entered through configuration of the router.

* * * * *

UNITED STATES PATENT AND TRADEMARK OFFICE
CERTIFICATE OF CORRECTION

PATENT NO. : 7,411,945 B2  Page 1 of 1
APPLICATION NO. : 11/038204
DATED : August 12, 2008
INVENTOR(S) : Monette et al.

It is certified that error appears in the above-identified patent and that said Letters Patent is hereby corrected as shown below:

In Column 2, Line 47, after "invention" insert -- . --.

In Column 5, Line 35, delete "then," and insert -- then --, therefor.

In Column 8, Line 48, delete "time-span" and insert -- time span --, therefor.

In Column 13, Line 9, delete "feast" and insert -- least --, therefor.

Signed and Sealed this

Twenty-eighth Day of April, 2009

JOHN DOLL
*Acting Director of the United States Patent and Trademark Office*